United States Patent
Li et al.

(10) Patent No.: US 11,732,103 B2
(45) Date of Patent: Aug. 22, 2023

(54) MODIFIED EXPANDED POLYSTYRENE PARTICLES, MODIFICATION METHOD THEREOF, CONCRETE CONTAINING MODIFIED EXPANDED POLYSTYRENE

(71) Applicant: XI'AN UNIVERSITY OF ARCHITECTURE AND TECHNOLOGY, Xi'an (CN)

(72) Inventors: Hui Li, Xi'an (CN); Wukui Zheng, Xi'an (CN); Diyang He, Xi'an (CN)

(73) Assignee: XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 18/100,764

(22) Filed: Jan. 24, 2023

(65) Prior Publication Data

US 2023/0235145 A1     Jul. 27, 2023

(30) Foreign Application Priority Data

Jan. 27, 2022   (CN) .......................... 202210101607.3

(51) Int. Cl.
  *C08J 9/228*     (2006.01)
  *C04B 16/08*    (2006.01)

(52) U.S. Cl.
  CPC ............... *C08J 9/228* (2013.01); *C04B 16/08* (2013.01); *C08J 2325/06* (2013.01)

(58) Field of Classification Search
  CPC ............................ C04B 16/08; C08J 2325/06
  See application file for complete search history.

(56) References Cited

U.S. PATENT DOCUMENTS

2021/0009472 A1    1/2021   Schabel, Jr. et al.

FOREIGN PATENT DOCUMENTS

| CN | 106515124 A | 3/2017 | | |
|---|---|---|---|---|
| CN | 106630835 A | 5/2017 | | |
| CN | 107954649 A | 4/2018 | | |
| CN | 110194641 A | * 9/2019 | ............ | C04B 16/10 |
| CN | 110713391 A | 1/2020 | | |
| CN | 113292265 A | 8/2021 | | |
| CN | 114105596 A | * 3/2022 | | |
| EP | 0410662 A2 | 1/1991 | | |
| WO | 9202468 A1 | 2/1992 | | |
| WO | 2009152617 A1 | 12/2009 | | |

OTHER PUBLICATIONS

Machine Translation of CN107954649A. Apr. 24, 2018. (Year: 2018).*
Machine Translation of CN110713391A. Jan. 21, 2020. (Year: 2020).*
Machine Translation of CN110194641A. Sep. 3, 2019. (Year: 2019).*
Machine Translation CN114105596A. Mar. 1, 2022. (Year: 2022).*
Peng et al. "Properties and engineering application of EPS external insulation mortar" Wall Material Innovation and Building Energy Conservation, 2007.
Jia, "Civil engineering materials" Xidian University Press, 2019, Abstract Only.
Jiang, "Research on Improvement of Strength of EPS Light Aggregate Concrete" Architecture Technology, vol. 40 No. 1 Jan. 2009.

* cited by examiner

*Primary Examiner* — Stephen E Rieth
(74) *Attorney, Agent, or Firm* — Stuart H. Mayer; Mayer & Williams PC

(57) ABSTRACT

Disclosed are modified expanded polystyrene (EPS) particles and a modification method thereof, and concrete containing the modified EPS particles and a preparation method thereof, relating to the technical field of inorganic building materials. The modification method of the EPS particles includes following steps: (1) spraying adhesive materials on surfaces of the EPS particles in a stirring state, and obtaining the EPS particles with the adhesive materials attached to the surfaces; and (2) mixing the EPS particles attached with the adhesive materials with inorganic mixed materials to obtain the modified EPS particles. The preparation method of modified EPS concrete includes: mixing the modified EPS particles with a cementitious material, adding an admixture and water, and uniformly stirring to obtain the modified EPS concrete.

5 Claims, 2 Drawing Sheets

MODIFIED EXPANDED POLYSTYRENE PARTICLES, MODIFICATION METHOD THEREOF, CONCRETE CONTAINING MODIFIED EXPANDED POLYSTYRENE

CROSS-REFERENCE TO RELATED APPLICATIONS

This application claims priority to Chinese Patent Application No. 202210101607.3, filed on Jan. 27, 2022, the contents of which are hereby incorporated by reference.

TECHNICAL FIELD

The application relates to the technical field of inorganic building materials, and in particular to modified expanded polystyrene (EPS) particles and a modification method thereof, and concrete containing the modified EPS particles and a preparation method thereof.

BACKGROUND

With improved living standards, people's requirements for residential comfort are also increasing, which directly leads to a sharp increase in building energy consumption. If a sealing performance and a thermal insulation performance of building external enclosure structures may be improved, the building energy consumption may be greatly reduced and a lot of resources may be saved.

Expanded polystyrene (EPS) is made of polystyrene resin beads as basic raw materials by expansion and foaming. EPS is an artificially prepared ultra-light material with low thermal conductivity, good impact toughness, good chemical stability, moisture resistance, good durability, sound absorption and energy absorption. As a packaging and thermal insulation material, EPS is widely used in various industrial production fields in the world. However, a particle density of EPS is much smaller than that of cement, only 7-18 kg/m$^3$, and an adhesion of EPS with the cement is very poor, so a strength of EPS concrete is affected and an application of the EPS concrete is seriously restricted, leading to a fact that the EPS concrete is mostly used in non-load-bearing structures at present.

SUMMARY

An objective of the application is to provide modified expanded polystyrene (EPS) particles and a modification method thereof, and concrete containing the modified EPS particles and a preparation method thereof, so as to solve problems existing in the prior art, ensure good cohesiveness between the EPS particles and the cement, finally realize a high strength of the EPS concrete, and expand an application range of EPS, so that EPS may meet application requirements of load-bearing structures.

To achieve the above objectives, the application provides following solutions.

One of the objectives of the application is to provide a modification method of the EPS particles, including following steps:

(1) spraying adhesive materials (adhesives) on surfaces of the EPS particles in a stirring state, and obtaining the EPS particles with the adhesive materials attached to the surfaces; and (2) mixing the EPS particles attached with the adhesive materials with inorganic mixed materials (coating materials) to obtain the modified EPS particles;

the adhesive materials include polyvinyl alcohol, epoxy resin, silane coupling agent and water; a mass ratio of polyvinyl alcohol, epoxy resin, silane coupling agent and water is 10-20:1-5:0.1-1:100;

the inorganic mixed materials include fly ash, cement, quartz sand, gypsum and mineral powder; a mass ratio of fly ash, cement, quartz sand, gypsum and mineral powder is 10-20:40-50:5-10:1-3:10-20; and a particle size of the EPS particles is 0.5 mm-10 mm; an apparent density is 25 kg/m$^3$-33 kg/m$^3$.

A mass ratio of the EPS particles, the adhesive materials and the inorganic mixed materials is 10:10:100.

Epoxy resin is a water-free modifier, and the EPS particles may be modified without changing a water-cement ratio.

Polyvinyl alcohol, as a solution modifier, has a wide application range, high adhesion and good water solubility.

Silane coupling agent has a best adhesive effect and may be applied to a preparation of high strength EPS concrete.

Quartz sand as a modified material has advantages of a low price, stable properties, coarse particles and an excellent modification effect.

Cement and fly ash as the coating materials have a pozzolanic effect, and a combination of cement and fly ash may greatly strengthen a transition layer between the EPS particles and cement slurry.

Gypsum, as a new fast-hardening cementitious material, may make the EPS particles surrounded by hard shells, thus strengthening the transition layer between the cement slurry and EPS.

The polyvinyl alcohol is cold water type polyvinyl alcohol with a polymerization degree of 1788; and the epoxy resin is bisphenol A epoxy resin.

The silane coupling agent is kh550; the cement is P.O..42.5 cement; and the quartz sand has a mesh number of 90-120 meshes.

The gypsum is gypsum dihydrate, and the mineral powder is S105 mineral powder.

The adhesive materials are sprayed within 1 min.

The inorganic mixed materials are added into reaction equipment within 1 min to complete mixing with the EPS particles attached with the adhesive materials.

In an adhesive formula used in the application, polyvinyl alcohol may be used as a film adhesive material to enhance the strength of interfaces between the EPS particles and cement particles, and may also be used as a surfactant to improve the adhesion; as an adhesive, epoxy resin may greatly improve the adhesion between the EPS particles and inorganic materials; silicone groups in silane coupling agent are reactive to inorganic substances, and organic functional groups are reactive or compatible to organic substances, so silane coupling agent may modify the EPS particles to make organic surfaces of the EPS particles adhere well to the inorganic substances and improve compatibility. These adhesives may greatly improve a strength of an aggregate interface transition layer of the EPS concrete, improve a compressive strength of the EPS concrete, and prevent the EPS concrete from floating and segregation of aggregates.

In a formula of inorganic coating materials used in the application, both fly ash and mineral powder are alkali-activated materials with the high pozzolanic effect. In order to prevent alkali ion migrations in the cement slurry from affecting a strength of an aggregate transition zone, the cement particles needed be added at the same time. As an excellent mineral admixture, morphology and micro-aggregate effect of fly ash may well fill the aggregate transition zone and enhance the strength of the zone. Mineral powder is a mineral admixture with a strong pozzolanic activity, and may greatly enhance a strength and hardness of an aggregate interface area. Volumes of cement, fly ash and mineral powder may be slightly reduced in a hydration process, so this reduction is resisted by adding quartz sand. Gypsum may expand slightly after adding water, and a certain amount of gypsum is added to make an interface layer more stable.

A second objective of the application is to provide the modified EPS particles prepared by the above preparation method.

A third objective of the application is to provide a modified EPS concrete, including the modified EPS particles and a cementitious material.

A fourth objective of the application is to provide a preparation method of the modified EPS concrete, including the following steps: modifying the EPS particles by the above modification method, mixing the obtained modified EPS particles with the cementitious material, adding an admixture and water, and uniformly stirring to obtain the modified EPS concrete.

Firstly, the admixture is dissolved in water, and then the admixture is added after adding the cementitious material.

In an embodiment, a mass ratio of the EPS particles to the cementitious material, the admixture and the water is 10:1000:1-4:300-400.

In an embodiment, the cementitious material is cement.

In an embodiment, the admixture is polycarboxylic acid water reducer.

The application discloses following technical effects.

As an organic material, the EPS particles are light and hydrophobic, and the adhesion with the cement particles is poor. The EPS particles may float up in ordinary EPS concrete, resulting in segregation of aggregate and slurry, thus seriously damaging physical properties of the concrete, leading to an inability of the EPS concrete to be used in normal construction. By adopting the modification method, an adhesive strength between the EPS particles and a cement slurry interface is greatly enhanced, the strength between the EPS particles and the transition layer of the cement slurry interface is significantly improved, and meanwhile distribution of the EPS particles in the EPS concrete may be improved, so that the concrete is light, low-carbon, with outstanding thermal insulation performance and mechanical properties, and application requirements of the load-bearing structures may be met.

The application has a simple and convenient technical route, is suitable for a large-scale industrial preparation, and greatly solves the problems in EPS concrete construction.

BRIEF DESCRIPTION OF THE DRAWINGS

In order to more clearly explain embodiments of the application or technical solutions in the prior art, the following may briefly introduce drawings that need to be used in the embodiments. Obviously, the drawings in the following description are only some embodiments of the application. For those of ordinary skill in the art, other drawings may be obtained according to these drawings without any creative effort.

DETAILED DESCRIPTION OF THE EMBODIMENTS

Figure 1:
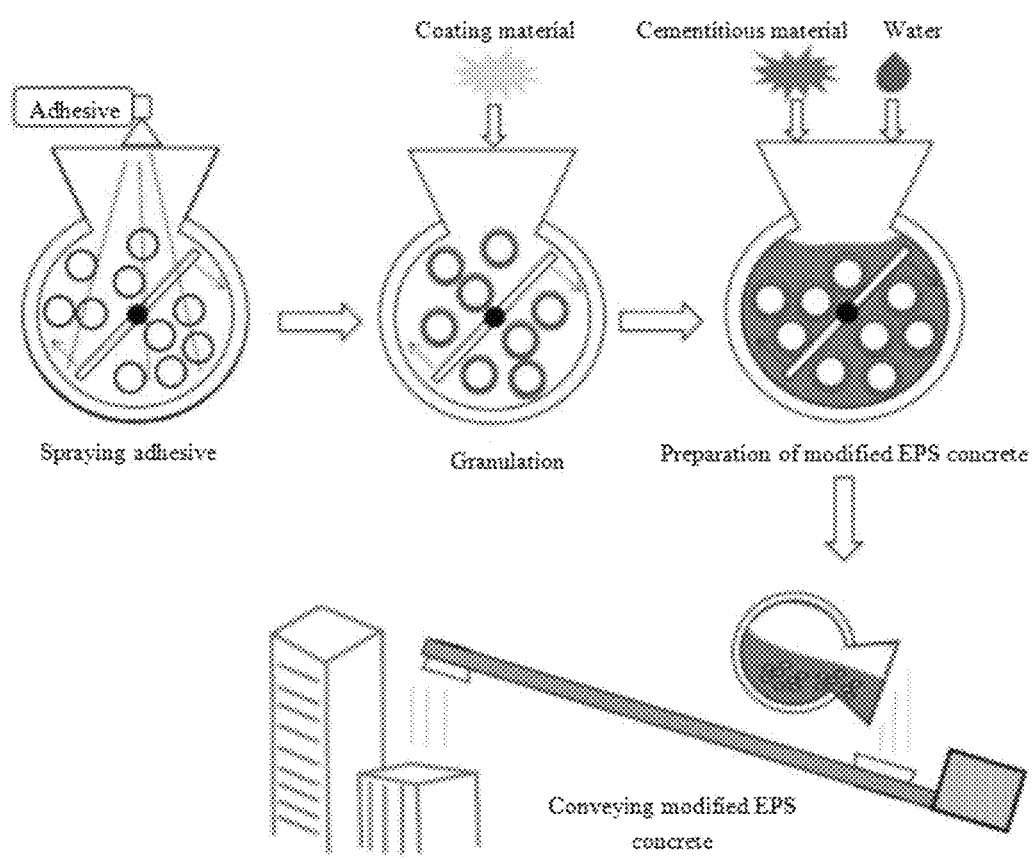
FIG. 1 is a flow chart of preparation of modified expanded polystyrene (EPS) concrete according to the application.
Figure 2:
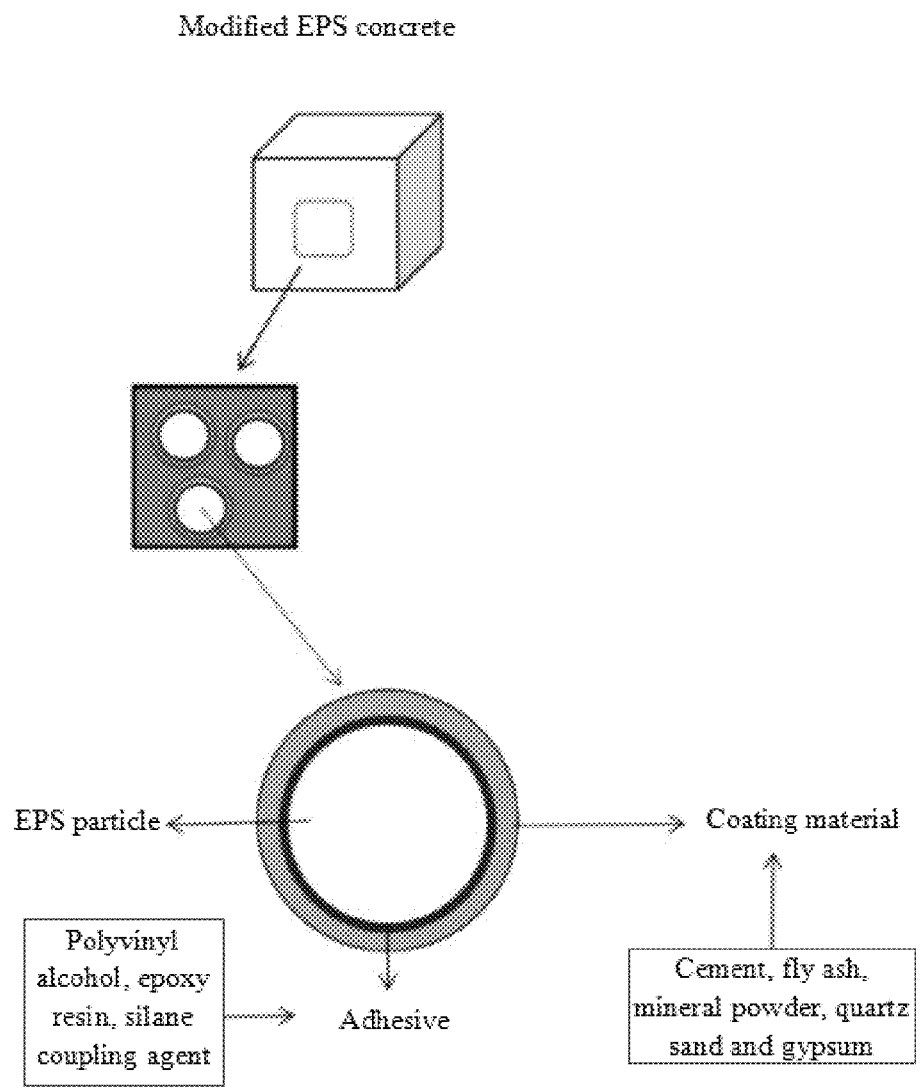
FIG. 2 is a schematic structural diagram of modified EPS concrete according to the application.

A number of exemplary embodiments of the application may be described in detail, and this detailed description should not be considered as a limitation of the application, but should be understood as a more detailed description of certain aspects, characteristics and embodiments of the application.

It should be understood that terminology described in the application is only for describing specific embodiments and is not used to limit the application. In addition, for numerical ranges in the application, it should be understood that each intermediate value between an upper limit and a lower limit of the range is also specifically disclosed. The intermediate value within any stated value or stated range and every smaller range between any other stated value or intermediate value within the stated range are also included in the application. The upper and lower limits of these smaller ranges may be independently included or excluded from the range.

Unless otherwise specified, all technical and scientific terms used herein have the same meaning as commonly understood by one of ordinary skill in the art to which this application relates. Although the application only describes the preferred methods and materials, any methods and materials similar or equivalent to those described herein may also be used in the practice or testing of the application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the application without departing from a scope or spirit of the application. Other embodiments may be obvious to the skilled person from the description of the application. The description and embodiments of that application are exemplary only.

The terms "including", "comprising", "having" and "containing" used in this application are all open terms, which means including but not limited to.

Unless otherwise specified, "parts" mentioned in the application are all based on parts by mass.

A particle size of expanded polystyrene (EPS) particles used in the embodiments of the application is 3 mm, and an apparent density is 30 kg/m$^3$;

cement used is ordinary portland cement with a strength grade of 42.5, conforming to GB1752007 general portland cement standard;

mineral powder used is S105 mineral powder, conforming to GBT18046-2008 for granulated blast furnace slag powder used in cement and concrete;

fly ash used is Class I fly ash, conforming to GB1596-91 for fly ash used in cement and concrete;

epoxy resin used is bisphenol A epoxy resin, conforming to GB/T 13657-2011 bisphenol A epoxy resin standard;

polyvinyl alcohol used is cold water type polyvinyl alcohol with a polymerization degree of 1788;

quartz sand used has a mesh number of 90-120 meshes and a silicon dioxide content of above 98%; and gypsum used is gypsum dihydrate;

an admixture used is polycarboxylic acid water reducer with a water reducing rate is 30%; and a model of silane coupling agent used is kh550.

Embodiment 1

A preparation method of modified EPS concrete specifically includes following steps:

(1) putting 10 parts of the EPS particles into a mixer and maintaining a stirring state; then, mixing polyvinyl alcohol, epoxy resin, silane coupling agent and water in a watering can according to a mass ratio of 10 : 1: 0.1 : 100 to obtain an adhesive material; and evenly spraying 10 parts of the adhesive material on surfaces of the EPS particles by the watering can within 1 min;

(2) continuing to add 100 parts of inorganic mixed material into the mixer, completely adding the inorganic mixed material within 1 min, and continuing to stir for 2 min after the addition is completed, where the inorganic mixed material consists of fly ash, cement, quartz sand, gypsum and mineral powder according to a mass ratio of 10:40:5:1:10; and (3) continuing to add 1,000 parts of cement into the mixer, and then dissolving 1 part of the admixture into 350 parts of water, and adding the mixture into the mixer; after the addition is completed, stirring for 5 min to obtain the modified EPS concrete, and conveying the modified EPS concrete to a storage site by pneumatic conveying concrete conveying equipment.

Embodiment 2

The preparation method of the modified EPS concrete specifically includes the following steps:

(1) Putting 10 parts of the EPS particles into the mixer and maintaining the stirring state; then, mixing polyvinyl alcohol, epoxy resin, silane coupling agent and water in the watering can according to the mass ratio of 10:1:0.1:100 to obtain the adhesive material; and evenly spraying 10 parts of the adhesive material on the surfaces of the EPS particles by the watering can within 1 min;

(2) continuing to add 100 parts of the inorganic mixed material into the mixer, completely adding the inorganic mixed material within 1 min, and continuing to stir for 2 min after the addition is completed, where the inorganic mixed material consists of fly ash, cement, quartz sand, gypsum and mineral powder according to a mass ratio of 20:50:10:3:20; and (3) continuing to add 1,000 parts of cement into the mixer, and then dissolving 1 part of the admixture into 350 parts of water, and adding the mixture into the mixer; after the addition is completed, stirring for 5 min to obtain the modified EPS concrete, and conveying the modified EPS concrete to the storage site by pneumatic conveying concrete conveying equipment.

Embodiment 3

The preparation method of the modified EPS concrete specifically includes the following steps:

(1) Putting 10 parts of the EPS particles into the mixer and maintaining the stirring state; then, mixing polyvinyl alcohol, epoxy resin, silane coupling agent and water in the watering can according to the mass ratio of 20:5:1:100 to obtain the adhesive material; and evenly spraying 10 parts of the adhesive material on the surfaces of the EPS particles by the watering can within 1 min;

(2) continuing to add 100 parts of the inorganic mixed material into the mixer, completely adding the inorganic mixed material within 1 min, and continuing to stir for 2 min after the addition is completed, where the inorganic mixed material consists of fly ash, cement, quartz sand, gypsum and mineral powder according to a mass ratio of 10:40:7.5:1:10; and (3) continuing to add 1,000 parts of cement into the mixer, and then dissolving 1 part of the admixture into 350 parts of water, and adding the mixture into the mixer; after the addition is completed, stirring for 5 min to obtain the modified EPS concrete, and conveying the modified EPS concrete to the storage site by pneumatic conveying concrete conveying equipment.

Embodiment 4

The preparation method of the modified EPS concrete specifically includes the following steps:

(1) Putting 10 parts of the EPS particles into the mixer and maintaining the stirring state; then, mixing polyvinyl alcohol, epoxy resin, silane coupling agent and water in the watering can according to the mass ratio of 15:2.5:0.5:100 to obtain the adhesive material; and evenly spraying 10 parts of the adhesive material on the surfaces of the EPS particles by the watering can within 1 min;

(2) continuing to add 100 parts of the inorganic mixed material into the mixer, completely adding the inorganic mixed material within 1 min, and continuing to stir for 2 min after the addition is completed, where the inorganic mixed material consists of fly ash, cement, quartz sand, gypsum and mineral powder according to a mass ratio of 15:45:7.5:1.5:15; and (3) continuing to add 1,000 parts of cement into the mixer, and then dissolving 1 part of the admixture into 350 parts of water, and adding the mixture into the mixer; after the addition is completed, stirring for 5 min to obtain the modified EPS concrete, and conveying the modified EPS concrete to the storage site by pneumatic conveying concrete conveying equipment.

Embodiment 5

The preparation method of the modified EPS concrete specifically includes the following steps:

(1) Putting 10 parts of the EPS particles into the mixer and maintaining the stirring state; then, mixing polyvinyl alcohol, epoxy resin, silane coupling agent and water in the watering can according to the mass ratio of 10:3:0.7:100 to obtain the adhesive material; and evenly spraying 10 parts of the adhesive material on the surfaces of the EPS particles by the watering can within 1 min;

(2) continuing to add 100 parts of the inorganic mixed material into the mixer, completely adding the inorganic mixed material within 1 min, and continuing to stir for 2 min after the addition is completed, where the inorganic mixed material consists of fly ash, cement, quartz sand, gypsum and mineral powder according to a mass ratio of 13:43:6:1:17; and (3) continuing to add 1,000 parts of cement into the mixer, and then dissolving 1 part of the admixture into 250 parts of water, and adding the mixture into the mixer; after the addition is completed, stirring for 5 min to obtain the modified EPS concrete, and conveying the modified EPS concrete to the storage site by pneumatic conveying concrete conveying equipment.

The physical properties of the modified EPS concrete prepared in embodiments 1-5 are shown in Table 1.

TABLE 1

| Test items | Embodiment 1 | Embodiment 2 | Embodiment 3 | Embodiment 4 | Embodiment 5 |
|---|---|---|---|---|---|
| Dry density (kg/m³) 28 d | 1289 | 1235 | 1265 | 1210 | 1250 |
| compressive strength (MPa) | 36.3 | 38.5 | 37.2 | 35.6 | 36.5 |
| Thermal conductivity (W/(m · K)) | 0.76 | 0.71 | 0.78 | 0.81 | 0.68 |

Comparative Example 1

The difference from embodiment 1 is that the EPS particles are not modified.

Comparative Example 2

The difference from embodiment 1 is that no cement is added to the inorganic mixed materials.

Comparative Example 3

The difference from embodiment 1 is that no epoxy resin is added to the inorganic adhesive materials.

Comparative Example 4

The difference from embodiment 1 is that the mass ratio of polyvinyl alcohol, epoxy resin, silane coupling agent and water is adjusted from 10:1:0.1:100 to 15:0.5:1.5:100.

Comparative Example 5

The difference from embodiment 1 is that the mass ratio of fly ash, cement, quartz sand, gypsum and mineral powder is adjusted from 10:40:5:1:10 to 25:35:15:5:5.

The physical properties of the modified EPS concrete prepared by comparative examples 1-5 are shown in Table 2.

TABLE 2

| Test items | Comparative example 1 | Comparative example 2 | Comparative example 31 | Comparative example 4 | Comparative example 5 |
|---|---|---|---|---|---|
| Dry density (kg/m³) 28 d | 1201 | 1275 | 1295 | 1295 | 1220 |
| compressive strength (MPa) | 22.5 | 26.3 | 28.5 | 24.6 | 26.1 |
| Thermal conductivity (W/(m · K)) | 0.80 | 0.78 | 0.71 | 0.75 | 0.82 |

The above-mentioned embodiments only describe a preferred mode of the application, and do not limit the scope of the application. Under a premise of not departing from a design spirit of the application, various modifications and improvements made by ordinary technicians in the field to the technical scheme of the application may fall within the protection scope determined by claims of the application.

What is claimed is:

1. A modification method of expanded polystyrene (EPS) particles, comprising:
   (1) spraying adhesive materials on surfaces of the EPS particles in a stirring state, and obtaining the EPS particles with the adhesive materials attached to the surfaces; and
   (2) mixing the EPS particles attached with the adhesive materials with inorganic mixed materials to obtain the modified EPS particles;
   the adhesive materials comprise polyvinyl alcohol, epoxy resin, silane coupling agent and water; a mass ratio of polyvinyl alcohol, epoxy resin, silane coupling agent and water is 10-20: -5:0.1-1:100 respectively;
   the inorganic mixed materials comprise fly ash, cement, quartz sand, gypsum and mineral powder; a mass ratio of fly ash, cement, quartz sand, gypsum and mineral powder is 10-20:40-50:5-10: 1-3:10-20 respectively;
   a particle size of the EPS particles is 0.5 mm-10 mm; and
   a mass ratio of the EPS particles, the adhesive materials and the inorganic mixed materials is 10:10:100 respectively.

2. Modified EPS particles prepared by the modification method according to claim 1.

3. A modified EPS concrete, comprising the modified EPS particles according to claim 2, a cementitious material and an admixture,
   wherein the cementitious material is cement, and the admixture is polycarboxylic acid water reducer.

4. A preparation method of the modified EPS concrete according to claim 3, comprising: mixing the modified EPS particles with the cementitious material, adding the admixture and water, and uniformly stirring to obtain the modified EPS concrete.

5. The preparation method according to claim 4, wherein a mass ratio of the EPS particles to the cementitious material, the admixture and water is 10:1000:1-4:300-400 respectively.

* * * * *